United States Patent
Rackers et al.

(10) Patent No.: US 7,448,671 B2
(45) Date of Patent: Nov. 11, 2008

(54) TWO LAYER PUMPABLE SOUND DEADENER

(75) Inventors: Craig Rackers, Ferndale, MI (US); Jeff Crist, Sterling Heights, MI (US); Dan Ondrus, Northville, MI (US); Stephen Ludwig, Ann Arbor, MI (US); Rajan Eadara, Ann Arbor, MI (US); Kirsen Quan, Canton, MI (US); Roy Jacob, Troy, MI (US); Anthony Konovaliv, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 442 days.

(21) Appl. No.: 11/018,194

(22) Filed: Dec. 21, 2004

(65) Prior Publication Data

US 2006/0054385 A1 Mar. 16, 2006

Related U.S. Application Data

(60) Provisional application No. 60/610,213, filed on Sep. 16, 2004.

(51) Int. Cl.
 *B60R 27/00* (2006.01)
(52) U.S. Cl. .............................. 296/187.02; 296/187.01; 296/187.03
(58) Field of Classification Search ............ 296/193.05, 296/146.1, 187.01, 187.02, 187.03, 187.09, 296/187.1, 187.11, 187.13; 428/212; 181/204, 181/290, 284, 294
See application file for complete search history.

(56) References Cited

U.S. PATENT DOCUMENTS

| | | | |
|---|---|---|---|
| 4,308,308 A | 12/1981 | Sachse | 428/168 |
| 4,734,323 A | 3/1988 | Sato | 428/317.3 |
| 5,094,318 A | 3/1992 | Maeda | 181/290 |
| 5,456,513 A | 10/1995 | Schmidt | 296/39.1 |
| 2002/0170776 A1 | 11/2002 | Bouyonnet | 181/290 |
| 2005/0050846 A1* | 3/2005 | Surace et al. | 52/782.1 |
| 2006/0040096 A1* | 2/2006 | Eadara et al. | 428/212 |

* cited by examiner

*Primary Examiner*—Lori L Lyjak
(74) *Attorney, Agent, or Firm*—Greg Brown, Esq; Miller Law Group, PLLC

(57) ABSTRACT

A two layer sound deadening material is formed from pumpable material applied through a pair of extrusion heads mounted on a single mount. A robot, used in high speed mass production automotive assembly lines, moves the door panel relative to the stationary extrusion heads to allow the simultaneous application of the two layers onto the interior side of the door. The first layer is formed of a thermosetting composition containing epoxy, rubber and a catalyst and adheres directly to the door panel. The second layer is formed of a thermosetting composition containing an epoxy resin, a thermo plastic copolymer and a curative which will adhere directly to the first layer due to similar chemical structures. The second layer is positioned such that the edges thereof are inside of the corresponding edges of the first layer to prevent read through transmission of noise from the body or door panel.

11 Claims, 2 Drawing Sheets

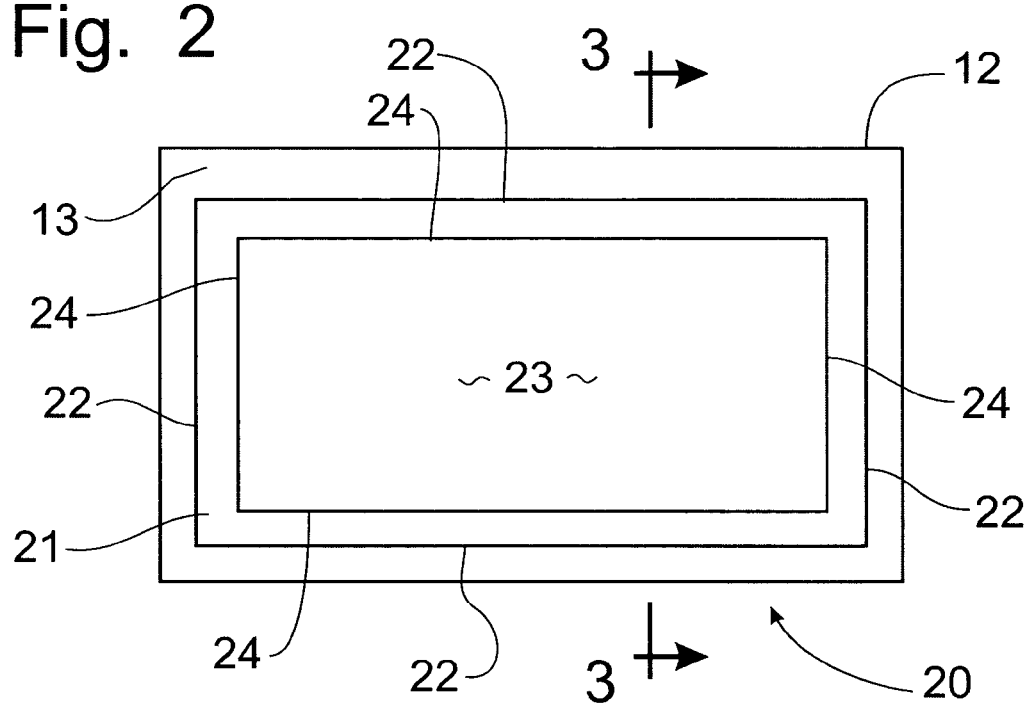
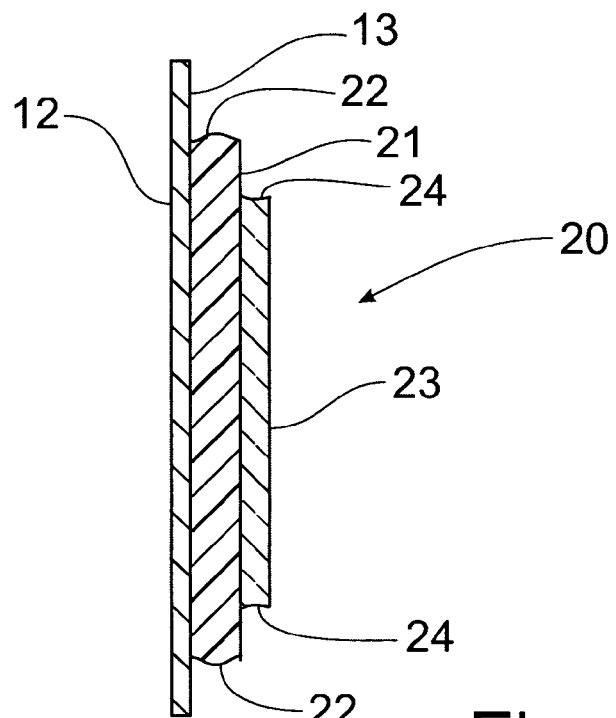

TWO LAYER PUMPABLE SOUND DEADENER

CROSS-REFERENCE TO RELATED APPLICATIONS

This application claims domestic priority on U.S. Provisional Patent Application Ser. No. 60/610,213, filed Sep. 16, 2004, the contents of which are incorporated herein by reference.

FIELD OF THE INVENTION

This invention relates to the application of sound deadening material to an automotive sheet metal component, such as a door or body panel, and, more particularly, to a sound deadening material that can be applied by a system that extrudes a ribbon of material on to a surface in a mass production manufacturing line.

BACKGROUND OF THE INVENTION

Automotive components, having a substantial expanse of metallic material that will vibrate when excited, produce a ringing sound that is not desirable in automobiles. More particularly, a door panel, which is typically formed from sheet metal and has a large span of metallic material, will produce an undesirable ringing sound when closing. This problem has been recognized for many years and a number of attempts have been made to apply a sound deadening material to the inside of the metallic panel in order to deaden the ringing sound that results from the mechanical excitement of the material upon effecting the closing of the door.

One form of deadening material is a single layer of a rubber-based material that is applied to the internal side of the door panel to deaden the ringing sound. Such material will not always provide adequate deadening results. A variation of this type of deadening material is to add a second stiffening member, such as an aluminum panel, applied against the rubber-based material to constrain the sound deadening material between the constraining member and the door panel. While this variation of sound deadening material provides a satisfactory performance, the utilization of this configuration is not optimally adaptable to mass production manufacturing techniques. The provision of a rolled aluminum material would require lift assistance in the assembly line as the roll of material would have a weight greater than 40 pounds and would present difficulties with size for shipping and loading.

In U.S. Pat. No. 4,308,308, granted to Erhard Sachse on Dec. 29, 1981, a two layer sound deadening member is shown where the interior layer is an anti-drumming sheet that has an adhesive layer for attachment to the door panel and a second formed stiffening sheet, which can be formed from fiberglass, that is bonded to the anti-drumming sheet of material. Such sound deadening members are specifically formed for each particular application and do not provide a cost effective alternative for mass production manufacturing techniques.

An extruded thermoplastic material forming part of a water barrier and sound deadening member is disclosed in U.S. Pat. No. 5,456,513, issued to Glen Schmidt on Oct. 10, 1995, for use on automotive door panels. This combination water and sound barrier is formed with a filled plastic material sandwiched between opposing unfilled plastic members, one of which has an adhesive layer for attachment to the door panel. The central filled plastic layer and the opposing unfilled plastic layers can be simultaneously extruded. Such water and sound barrier panels are formed to be attached to specific door panels and, therefore, are not a cost effective alternative for mass production manufacturing techniques.

U.S. Pat. No. 5,094,318, granted to Takashi Maeda on Mar. 10, 1992, discloses a sound absorption material fabricated from various plastic and rubber materials for use in applications such as an automotive dashboard. The moldable plastic constraining material is located between a sound absorbing material and an adhesive dampening sheet formed of a petroleum resin, which can be attached to the dashboard. This integrated member is also preformed for specific installation on particular car components and, therefore, does not present a cost effective alternative for use in mass production manufacturing lines.

A combination of a soundproof material layer and a vibration dampening material layer formed into a sheet is taught in U.S. Pat. No. 4,734,323, issued to Junichi Sato on Mar. 29, 1988. This sheet of material is formed flat. In U.S. Patent Application Publication No. 2002/0170776, published on Nov. 21, 2002, an acoustic layer is placed on a panel that is attached to a door skin by an adhesive. As with the other prior art sound absorption members, this approach does not present a cost effective mass production manufacturing technique.

It would be desirable to provide a two layer sound deadening material that can be pumped into a manufacturing line to be applied in a manner that is conducive to mass production applications.

SUMMARY OF THE INVENTION

It is an object of this invention to overcome the aforementioned disadvantages of the known prior art by providing a pumpable two layer sound deadening material that can be applied directly to the interior surface of an automotive door panel on a mass production assembly line.

It is another object of this invention to provide a two layer pumpable sound deadening material in which the first layer is applied directly to the interior side of an automotive door panel to provide a sound deadening layer and a second layer applied to the first layer to form a constraining layer.

It is an advantage of this invention that the two layer sound deadening material can be applied to the interior side of a door panel as a part of the mass production manufacturing process.

It is a feature of this invention that the two layer sound deadening material can be applied by a system that is comprised of a bulk unloaded pump (pneumatic) that supplies a shot meter (doser) that supplies a gun valve that extrudes a ribbon of material on to a surface. The extruder head in this case has two slots (dual orifice) to co-extrude the two materials. The size of the slots, flow rate of materials and robot speed all affect the thickness of each component.

It is another feature of this invention that the application of the second material provides a stiffening constraining layer for the applied sound deadening material in the first layer.

It is another advantage of this invention that the constraining layer is applied by a system that extrudes a ribbon of material on to a surface.

It is still another feature of this invention that the second layer of pumpable material is applied to the first layer to form a constraining layer that is positioned such that the edges of the constraining layer are located inside the respective edges of the sound deadening first layer.

It is still another advantage of this invention that the positioning of the second stiffening layer with the edges thereof inside the respective edges of the first sound deadening layer prevents the second stiffening layer from contacting the door panel and displaying read-through or show through characteristics that can be seen on the exterior of the door or body panel.

It is yet another feature of this invention that the co-extruded patch can either be extruded onto the door from a fixed extruder gun by moving the door under the material (pedestal dispense) or the gun can be fixed on the end of a robot arm and dispensed onto a door nested in a fixture (end effectors dispensed).

It is still another feature of this invention that the first sound deadening layer is formed of a thermosetting composition containing an epoxy, rubber and a catalyst to permit adherence to the door panel.

It is a further feature of this invention that the second layer is formed of a thermosetting composition containing an epoxy resin, thermo plastic copolymer and a curative to permit adhesion between the first and second layers.

It is yet another advantage of this invention that similar chemical structures of the first and second layers allows the two layers to adhere to one another without the insertion of an additional adhesive material.

It is a further advantage of this invention that the process allows for robotic application at high speed of the pumpable material through a system that extrudes a ribbon of material on to a surface, eliminating the need for application of a stiffening layer by hand.

It is still another object of this invention to provide a process for applying a sound deadening layer to a vehicle body or door panel, and a two layer pumpable sound deadening material that is durable in construction, inexpensive of manufacture, carefree of maintenance, facile in assemblage, and simple and effective in use.

These and other objects, features and advantages are accomplished according to the instant invention by providing a two layer sound deadening material formed from pumpable material applied through a system that extrudes a ribbon of each layer of material mounted on a single mounting head. A robot, used in high speed mass production automotive assembly lines, moves the door panel relative to the stationary extruding system to allow the simultaneous application of the two layers onto the interior side of the door. The first layer is formed of a thermosetting composition containing an epoxy, rubber and a catalyst and adheres directly to the door panel, while the second layer is formed of a thermosetting composition containing an epoxy resin, thermo plastic copolymer and a curative and adheres directly to the first layer due to similar chemical structures. The second layer is positioned such that the edges thereof are inside of the corresponding edges of the first layer to prevent read through transmission of noise from the body or door panel.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a schematic elevational view of the door panel having the two layered pumpable sound deadening material applied thereto; and FIG. 3 is a schematic cross-sectional view of door panel with the two layered pumpable sound deadening material applied thereto, corresponding to lines 3-3 of FIG. 2.

DETAILED DESCRIPTION OF THE PREFERRED EMBODIMENT

Figure 1:
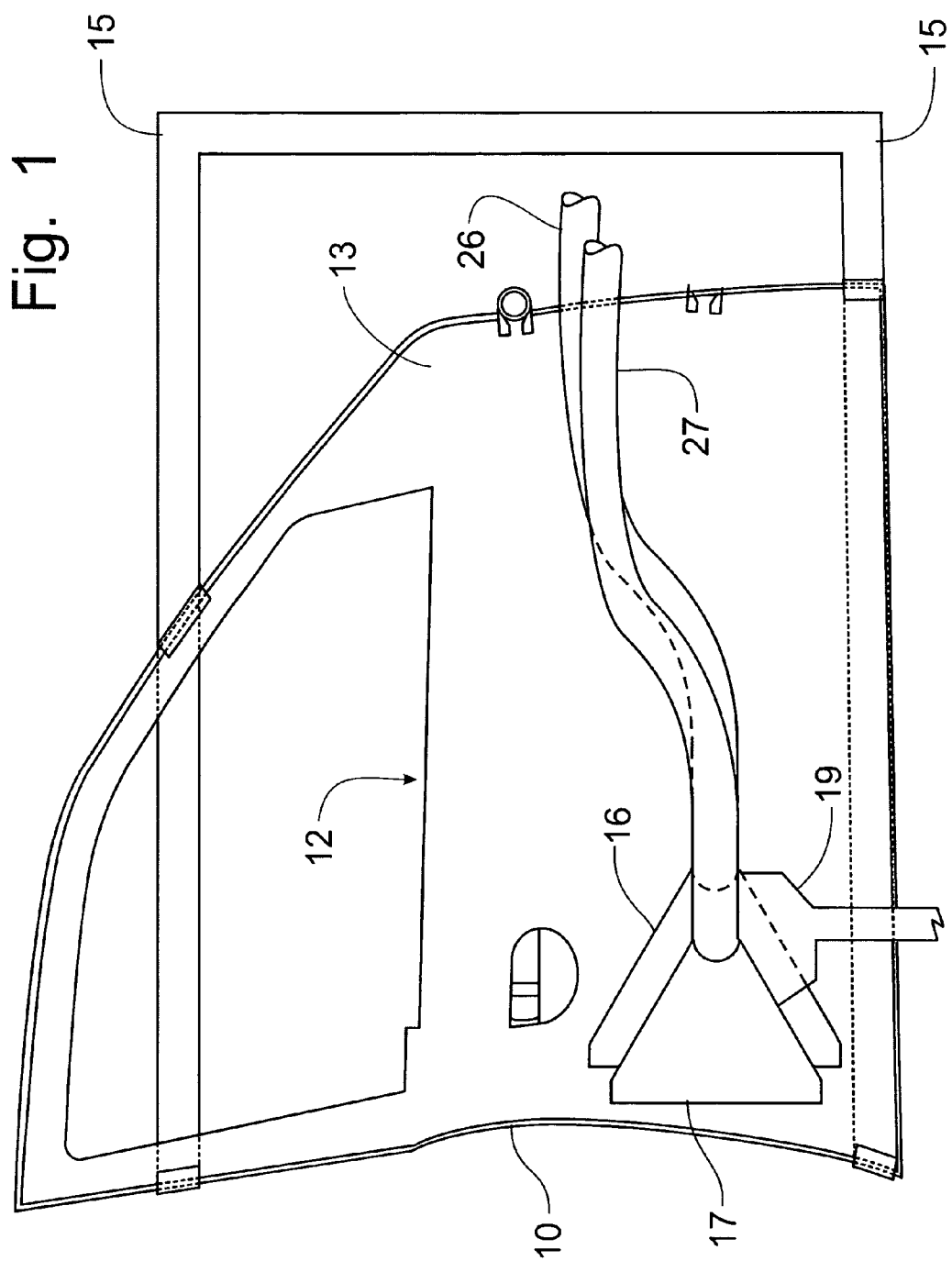
FIG. 1 is a schematic perspective view of a door panel being positioned adjacent an extrusion system applying two layers of sound deadening material onto the interior side of the door panel being moved by a robot.

Referring to drawings, an automotive vehicle door panel having sound deadening material applied thereto incorporating the principles of the instant invention can best be seen. The vehicle door panel 10 is of generally conventional nature and is formed with a central panel 12 that will resonate a ringing sound when the door is closed against the frame of the automobile (not shown), as will be recognized by one of ordinary skill in the art, unless the central panel has attached thereto a sound deadening material.

According to the principles of the instant invention, the sound deadening member 20 is formed in a first layer 21 from a material that is a combination of an epoxy, such as glycidyl ether or bisphenol A, bisphenol F or novolac; a rubber material, such as styrene-butadiene rubber, butadiene, epdm, nitrile, ethylene acrylic, butyl rubber or isoprene; and a catalyst, such as dicyandiamide, zinc diacrylate or dicumylperoxide. This material has a low density and is free-forming in nature in the sense that the material can flow through a conduit 26 to an applicator to be applied to and spread against the interior side 13 of the central door panel 12. By its general nature, this material forming the first layer 21 will adhere to the interior surface 13 of the central door panel 12.

Similarly, the second layer 23 is formed from a thermosetting composition containing an epoxy resin, thermo plastic copolymer and a curative. Like the material forming the first layer 21, the material forming the second layer 23 can also flow through a conduit 27 to be applied to the surface of the first layer 21. Because of the similar chemical structure of the materials in the first and second layers 21, 23, the second layer 23 will adhere to the surface of the first layer 21. This material in the second layer 23 will cure into a rigid formation to define a constraining layer for the first layer 21 of sound deadening material.

Since the second layer 23 cures into a rigid material that can serve as a constraining layer for the first layer 21 of sound deadening material, the second layer 23 is applied to the surface of the first layer 21 in a manner such that the edges 24 of the second layer 23 are located inside the corresponding edges 22 of the first layer 21, as is best seen in FIGS. 2 and 3. As a result, the first layer 21 projects outwardly around the entire periphery define by the edges 24 of the second layer 23. Allowing the second layer 23 to contact directly the surface of the door panel 12 would allow show through on the exterior of door panel 12 due to differences in material tensile strength and expansion properties.

In application, the material for both the first and second layers 21, 23 are pumped by a conventional pneumatic bulk unload pump (not shown) to a shot meter (not shown) and through corresponding conduits 26, 27 to respective extruding heads 16, 17 mounted on a single mounting head 19, or in the alternative a single extruding head having dual slots operable to dispense a ribbon of material onto the surface of the body or door panel. The size of the slots in the extruder head(s), the flow rate of materials and robot speed all affect the thickness of each component forming the first and second layers 21, 23.

The material from the first extrusion head 16 is deposited on the interior surface 13 of the central door panel 12, which due to the chemical nature of the material adheres directly to the door panel 12. Immediately behind the first extrusion head 16, the second extrusion head 17 deposits the material therefrom directly on top of the first layer 21 to form the second layer 23. Preferably, the extrusion heads 16, 17 are mounted in a stationary manner so as to minimize problems associated with the material exiting the extrusion heads 16, 17. The material forming the first and second layers 21, 23 are appropriately deposited on the door panel 12 via a robot 15 supporting the door panel 12 for movement relative to the extrusion heads 16, 17.

A controller (not shown) will time the discharge of the material from the second extrusion head 17 in a manner to allow the second layer 23 to begin forming after the first layer 21 has started on the door panel 12, thus positioning the beginning of the second layer 23 inside the first edge 22 of the first layer 21. Since the second extrusion head 17 has a transverse width less than the corresponding transverse width of the first shovel gun 16, the side edges 22 of the first layer 21 will project outwardly beyond the side edges 24 of the second layer 23. By reason of the spaced apart mounting of the second extrusion head 17 relative to the first extrusion head 16, the flow of material to the two extrusion heads 16, 17 can terminate at substantially the same time and still provide the formation of the first layer 21 projecting beyond the final edge 24 of the second layer 23.

Providing a process in which both layers 21, 23 of the sound deadening member 20 are formed with pumpable material fed through extrusion heads 16, 17, allows the two layered sound deadening member 20 to be formed with minimum cost in a mass production automotive assembly line. This process allows for robotic application at high line speed, eliminating labor required to apply a hand-applied constraining layer over the sound deadening material of the first layer 21. The application of the two layered sound deadening member 20 may provide additional stiffness in the door panel 12 with minimal potential for read-through based on the first rubber-based layer 21.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a vehicle body or door panel having a central panel portion including an interior side, an improved sound deadening material consisting essentially of:
    a first sound absorbing layer formed of a first flowable material applied on said interior side of said central panel portion by a first applicator having said first material pumped thereto from a remote source of said first material, said first sound absorbing material including a thermosetting composition containing an epoxy, a rubber material and a catalyst; and
    a second constraining layer formed of a second flowable material applied to said first sound absorbing layer by a second applicator having said second material pumped thereto from another remote source.

2. The vehicle body or door panel of claim 1 wherein said second constraining material includes a thermosetting composition containing an epoxy resin, thermo plastic copolymer and a curative, said constraining layer curing into a rigid member.

3. In a vehicle body or door panel having a central panel portion including an interior side, an improved sound deadening material comprising:
    a first sound absorbing layer formed of a first flowable material applied on said interior side of said central panel portion by a first applicator having said first material pumped thereto from a remote source of said first material; and
    a second constraining layer formed of a second flowable material applied to said first sound absorbing layer by a second applicator having said second material pumped thereto from another remote source, said second layer being formed with peripheral edges defining a peripheral boundary being located inside a corresponding peripheral boundary of said first layer such that said second layer does not directly contact said vehicle door panel.

4. The vehicle body or door panel of claim 3 wherein said first and second applicators are extrusion heads, said second extrusion head having a transverse width smaller than a corresponding transverse width of said first extrusion head so that said second layer is formed internally of said peripheral boundary of said first layer.

5. The vehicle body or door panel of claim 4 wherein said second layer cures into a rigid member constraining said first layer to deaden sounds transmitted by said vehicle body or door panel.

6. A sound deadening member attachable to a vehicle body or door panel comprising:
    a first sound absorbing layer formed of a first flowable material applied directly on an interior side of said door panel by a first applicator having said first material pumped thereto from a remote source of said first material, said first material includes a thermosetting composition containing an epoxy, a rubber material and a catalyst; and
    a second constraining layer formed of a second flowable material applied on top of said first sound absorbing layer by a second applicator having said second material pumped thereto from another remote source, said second constraining layer curing into a rigid member, said second layer being formed with peripheral edges defining a peripheral boundary being located inside a corresponding peripheral boundary of said first layer such that said second layer does not directly contact said vehicle door panel.

7. The sound deadening member of claim 6 wherein said epoxy is one or more members selected from the group consisting of glycidyl ether, bisphenol A, bisphenol F and novolac, said rubber material is one or more members selected from the group consisting of styrene-butadiene rubber, butadiene, epdm, nitrile, ethylene acrylic, butyl rubber or isoprene; and said catalyst is one or more members selected from the group consisting of dicyandiamide, zinc diacrylate and dicumylperoxide.

8. The sound deadening member of claim 6 wherein said second material is a thermosetting composition containing an epoxy resin, a thermo plastic copolymer and a curative.

9. The sound deadening member of claim 6 wherein said first and second applicators are extrusion heads supported on a common mounting head to permit a simultaneous application of said first and second layers while said vehicle door is moved relative to said mounting head.

10. The sound deadening member of claim 9 wherein said first extrusion head has a transverse width smaller than a corresponding transverse width of said first extrusion head to permit said first layer to be formed in a wider path on said vehicle door than said second layer.

11. The sound deadening member of claim 6 wherein said second layer is formed with a peripheral boundary, said first layer having an exposed portion extending around said peripheral boundary such that said second layer does not contact said vehicle door panel directly.

* * * * *